United States Patent
Bhargava et al.

(10) Patent No.: US 11,286,316 B2
(45) Date of Patent: Mar. 29, 2022

(54) COMPRESSION BLOW FORMED HDPE CONTAINERS AND METHODS OF MAKING THE SAME

(71) Applicant: Alltrista Plastics, LLC, Boca Raton, FL (US)

(72) Inventors: Saumitra Bhargava, Clarksville, MD (US); Todd M. Zillmer, Greenville, SC (US)

(73) Assignee: ALLTRISTA PLASTICS, LLC, Greer, SC (US)

( * ) Notice: Subject to any disclaimer, the term of this patent is extended or adjusted under 35 U.S.C. 154(b) by 672 days.

(21) Appl. No.: 15/787,774

(22) Filed: Oct. 19, 2017

(65) Prior Publication Data

US 2018/0105622 A1    Apr. 19, 2018

Related U.S. Application Data

(60) Provisional application No. 62/410,014, filed on Oct. 19, 2016.

(51) Int. Cl.
| | | |
|---|---|---|
| C08F 110/02 | (2006.01) | |
| C08L 23/04 | (2006.01) | |
| B29C 49/02 | (2006.01) | |
| C08K 5/00 | (2006.01) | |
| C08L 23/06 | (2006.01) | |
| B29K 23/00 | (2006.01) | |
| B29K 105/00 | (2006.01) | |
| B29L 31/00 | (2006.01) | |

(52) U.S. Cl.
CPC ............ *C08F 110/02* (2013.01); *B29C 49/02* (2013.01); *C08K 5/0083* (2013.01); *C08L 23/04* (2013.01); *C08L 23/06* (2013.01); *B29C 2049/028* (2013.01); *B29K 2023/065* (2013.01); *B29K 2105/0094* (2013.01); *B29K 2995/0063* (2013.01); *B29L 2031/712* (2013.01); *C08F 2500/07* (2013.01); *C08L 2205/025* (2013.01)

(58) Field of Classification Search
None
See application file for complete search history.

(56) References Cited

U.S. PATENT DOCUMENTS

| | | |
|---|---|---|
| 6,914,113 B2 | 7/2005 | McLeod et al. |
| 7,658,882 B2 | 2/2010 | Minganti |
| 8,366,436 B2 | 2/2013 | Parrinello et al. |
| 8,476,394 B2 | 7/2013 | St. Jean et al. |

(Continued)

FOREIGN PATENT DOCUMENTS

| | | |
|---|---|---|
| EP | 3293211 A1 | 3/2018 |
| JP | S62-20543 A | 1/1987 |

(Continued)

OTHER PUBLICATIONS

Search Report issued in United Kingdom Application No. 1717185.1, dated Apr. 19, 2018 (4 pages).

(Continued)

*Primary Examiner* — Monica A Huson
(74) *Attorney, Agent, or Firm* — Eversheds Sutherland (US) LLP

(57) ABSTRACT

Compression blow formed articles having improved barrier properties and methods of making the same are provided herein.

10 Claims, 4 Drawing Sheets

(56) References Cited

U.S. PATENT DOCUMENTS

| | | | |
|---|---|---|---|
| 8,703,972 B2 | 4/2014 | Ding et al. | |
| 9,512,308 B2 | 12/2016 | Vittorias et al. | |
| 9,738,777 B2 | 8/2017 | Vittorias et al. | |
| 2002/0103300 A1 | 8/2002 | Klosiewicz | |
| 2010/0105839 A1 | 4/2010 | Mehta | |
| 2015/0086736 A1* | 3/2015 | Dotson | C08J 5/18 428/36.9 |

FOREIGN PATENT DOCUMENTS

| | | | |
|---|---|---|---|
| JP | 2011-032338 A | | 2/2011 |
| JP | 2012-111801 A | | 6/2012 |
| WO | 2011/043944 A2 | | 4/2011 |
| WO | 2013/101767 A2 | | 7/2013 |
| WO | 2017112503 A2 | † | 6/2017 |

OTHER PUBLICATIONS

Seven et al., "Nucleating Agents for High-Density Polyethylene—A Review," Polymer Engineering and Science, 2016, vol. 56, Issue 5, pp. 541-554. DOI: 10.1002/pen.24278.

Technical Information for Dow® Continuum™ DMDD-6620 HEALTH+™ Bimodal Polyethylene Resin, Rev: May 31, 2016 (2 pp.).

Dow Brochure dated Oct. 2016, Title: Strong Medicine for Blow Molded Healthcare Applications, 4 pages.†

\* cited by examiner
† cited by third party

COMPRESSION BLOW FORMED HDPE CONTAINERS AND METHODS OF MAKING THE SAME

CROSS-REFERENCE TO RELATED APPLICATIONS

This application claims priority of U.S. Provisional Patent Application No. 62/410,014, filed on Oct. 19, 2016, the entirety of which is hereby incorporated herein by reference.

FIELD OF THE DISCLOSURE

The present disclosure relates to articles formed from high-density polyethylene (HDPE) resins and methods of making the same.

BACKGROUND

HDPE resins are widely used across a variety of industries including, for example, to create containers used to store food, beverages, pharmaceuticals, and the like. However, the shelf life of products stored in these containers is often limited by the barrier properties of the HDPE resins. Specifically, the shelf life of products stored in these containers is often limited by the ability of these resins to prevent the transfer of oxygen and moisture through the container walls. For example, MARLEX® 5502BN resin, an HDPE resin available from Chevron Phillips Chemical Company, is widely used to create bottles for storing pharmaceutical products, but has a moisture vapor transmission rate (MVTR) of about 3.0 mg/day in a standard 150 cc bottle having an average thickness of 0.77 mm when measured at 50° C. and at 50% relative humidity, according to USP <661>. This MVTR limits the shelf life of goods stored in these containers.

HDPE resins are often used in extrusion or blow forming processes to make containers and other products. However, creating containers by extrusion or blow forming HDPE resins often results in containers which are inconsistent in thickness and quality. The inconsistent thickness and quality of these containers may further reduce the barrier characteristics of these containers.

Accordingly, improved articles formed from HDPE resin and methods of making the same are needed.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

In one aspect, a method of making an article is provided which includes compression blow forming an HDPE resin characterized by: a halftime of crystallization of less than 2 minutes when measured at 124° C., a density of at least about 0.955 g/cm$^3$, and a die swell of less than about 1.5.

In another aspect, an article is provided, including a compression blow formed HDPE resin, wherein the resin is characterized by: a halftime of crystallization of less than 2 minutes when measured at 124° C., a density of at least about 0.955 g/cm$^3$, a die swell of less than about 1.5.

BRIEF DESCRIPTION OF THE DRAWINGS

The following figures form part of the present specification and are included to further demonstrate certain aspects of the present disclosure. The invention may be better understood by reference to one or more of these figures in combination with the detailed description of specific aspects presented herein.

DETAILED DESCRIPTION

Figure 1:
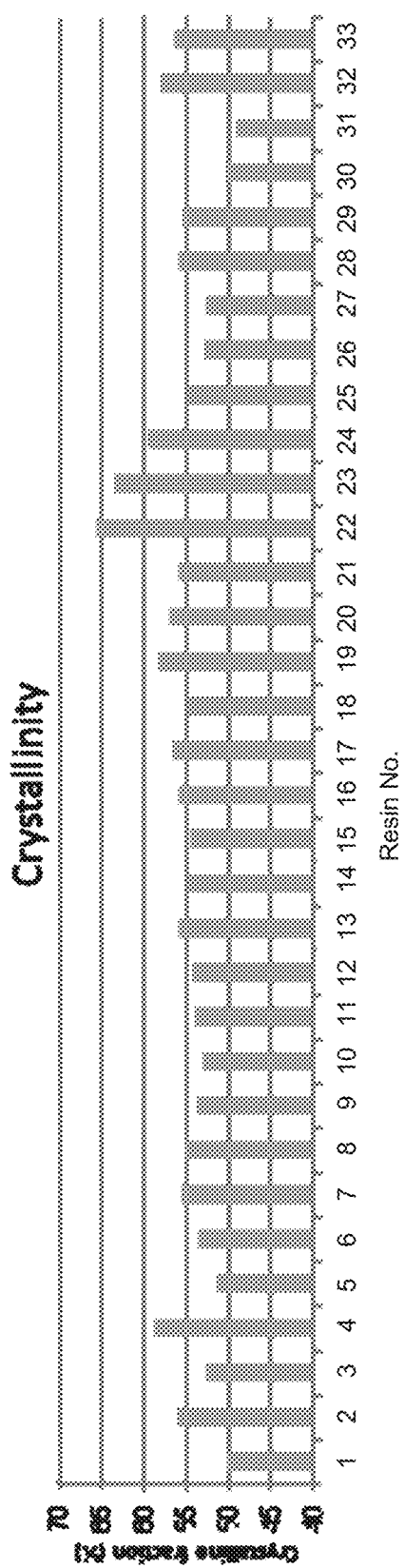
FIG. 1 is a graph illustrating the crystalline fraction measured for various HDPE resins.

Articles formed from HDPE resins, and methods of making the same are provided herein.

If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

As used herein, the term "container" is used broadly to refer to a vessel having a hollow interior defined by one or more sidewalls and one or more openings. Containers include, but are not limited to, bottles, jars, and the like, and may or may not include a lid, a cap, or seal over the one or more openings. For example, in some embodiments, a container is a pharmaceutical bottle, such as are known to be combined with a foil seal and a removable cap.

As used herein, the term "die swell" is used broadly to refer to a ratio of the diameter of an extruded resin as compared to the inner diameter of an extrusion nozzle. Specifically, as described herein, "die swell" refers to the ratio of the diameter of an extruded resin as compared to the inner diameter of a "Standard" nozzle on a model CBF20 compression blow forming machine, available from Sacmi Cooperativa Meccanici Imola Societa' Cooperativa, when the five zones of the extruder are operated at temperatures ranging from 165° C. in the first zone to 215° C. in the fifth zone, the flange and pump were operated at 225° C., and the nozzle was set at 230° C.

Compression blow forming ("CBF") combines several key attributes from other well-known and proven processes. Typically, compression blow forming machines are fitted with a precision extrusion unit. Resins are extruded through the precision extrusion unit, cut to a precise weight or volume, and dropped into a compression cup. The compression cup containing the resin is then transferred into the machine's main rotary system, where it is compressed into a preformed shape, stretched (as needed) and blown to the final geometry. CBF processes typically require lower processing temperatures than other processes, such as extrusion or blow forming processes. These lower processing temperatures allow for faster overall cycle times and improved physical properties and aesthetics of the finished containers. In some embodiments, compression blow forming allows for the production of containers directly from continuously extruded polymer pellets. For example, compression blow forming equipment is available from Sacmi Cooperativa Meccanici Imola Societa' Cooperativa as is described in U.S. Pat. No. 8,366,436, entitled "Apparatuses and Methods for Manufacturing Containers," the disclosure of which is hereby incorporated by reference in its entirety.

In some embodiments, a method of making an article is provided, including compression blow forming an HDPE resin, wherein the HDPE resin is characterized by a halftime of crystallization of less than 2 minutes when measured at 124° C., a density of at least about 0.955 g/cm³, and a die swell of less than about 1.5. In some embodiments, a method of making an article is provided, including compression blow forming an HDPE resin, wherein the HDPE resin is characterized by a halftime of crystallization of less than 2 minutes when measured at 124° C. and a density of at least about 0.955 g/cm³.

In some embodiments, an article is provided including a compression blow formed HDPE resin, wherein the resin is characterized by: a halftime of crystallization of less than 2 minutes when measured at 124° C., a density of at least about 0.955 g/cm³, a die swell of less than about 1.5. In some embodiments, an article is provided including a compression blow formed HDPE resin, wherein the resin is characterized by: a halftime of crystallization of less than 2 minutes when measured at 124° C., and a density of at least about 0.955 g/cm³.

While not intending to be bound by any particular theory, it is believed that a halftime of crystallization of less than 2 minutes when measured at 124° C. allows the HDPE resin to achieve a higher degree of crystallinity than comparable resins with higher halftime of crystallization, resulting in better barrier properties. While not intending to be bound by any particular theory, it is believed that higher-density HDPE resins have a higher potential to achieve greater crystallinity and typically have a faster halftime of crystallization. While not intending to be bound by any particular theory, it is believed that a die swell of less than about 1.5 corresponds to a lower $MW_{z+1}$ molecular weight, or resin molecular weight distribution with smaller amounts of highest molecular weight polymers. Smaller amounts of the highest molecular weight polymers typically result in a greater die swell. While not intending to be bound by any particular theory, it is believed that resins with lower die swells will also have a lower orientation of crystals within the wall section, resulting in a torturous path for oxygen and water molecules passing through the resin, which results in an article having better barrier properties.

In some embodiments, the article is manufactured to meet or exceed 6 Sigma, the US Food and Drug Administration's Good Manufacturing Practice ("US FDA GMP"), and US Pharmacopeial Convention ("USP") requirements. In some embodiments, the article is a container. In some embodiments, the container is a bottle. In some embodiments, the bottle may be a 60 cubic centimeter (cc) Tab II pharmaceutical bottle having an average wall thickness of 0.70 mm. In some embodiments, the bottle may be a 150 ml, 16 g weight bottle having a diameter of 50.5 mm, a total height of 105 mm, and an average wall thickness of 0.77 mm.

In some embodiments, the ratio of a height of the container to a diameter of the container is 4:1 or less, for example a ratio of a height of the container to a diameter of the container is about 4:1, about 3.5:1, about 3:1, about 2.5:1, about 2:1, about 1.5:1, about 1:1, about 0.5:1, or any ranges therebetween.

In some embodiments, the resin is further characterized by a melt flow index of from about 1 to about 2 when measured according to AS™ D1238, for example about 1, about 1.1, about 1.2, about 1.3, about 1.4, about 1.5, about 1.6, about 1.7, about 1.8, about 1.9, about 2, or any ranges therebetween.

In some embodiments, the HDPE resin may further include one or more delustrants or colorants, for example titanium dioxide, calcium carbonate, carbon black, dyes, pigments, and combinations thereof.

In some embodiments, the resin is further characterized by a melt flow index of less than about 1.8 when measured according to AS™ D1238, for example a melt flow index of about 1.7, about 1.6, about 1.5, about 1.4, about 1.3, about 1.2, about 1.1, about 1.0, about 0.9, about 0.8, about 0.7, about 0.6, about 0.5, about 0.4, about 0.3, about 0.2, about 0.1, or any ranges therebetween. In some embodiments, the halftime of crystallization is less than 1 minute when measured at 124° C.

In some embodiments, the article has a moisture vapor transmission rate ("MVTR") of less than about 2 mg/day in a 150 cc bottle having an average thickness of 0.77 mm when measured at 50° C. at 50% relative humidity, according to USP <661>, for example, a MVTR of about 2 mg/day, about 1.9 mg/day, about 1.8 mg/day, about 1.7 mg/day, about 1.6 mg/day, about 1.5 mg/day, about 1.4 mg/day, about 1.3 mg/day, about 1.2 mg/day, about 1.1 mg/day, about 1.0 mg/day, about 0.9 mg/day, about 0.8 mg/day, about 0.7 mg/day, about 0.6 mg/day, about 0.5 mg/day, about 0.4 mg/day, about 0.3 mg/day, about 0.2 mg/day, about 0.1 mg/day, or any ranges therebetween.

In some embodiments, the density is between about 0.955 g/cm³ and about 0.963 g/cm³, for example about 0.955 g/cm³, about 0.956 g/cm³, about 0.957 g/cm³, about 0.958 g/cm³, about 0.959 g/cm³, about 0.960 g/cm³, about 0.961 g/cm³, about 0.962 g/cm³, about 0.963 g/cm³, or any ranges therebetween. In some embodiments, the density is at least about 0.963 g/cm³, or at least about 0.966 g/cm³, for example about 0.963 g/cm³, about 0.964 g/cm³, about 0.965 g/cm³, about 0.966 g/cm³, about 0.967 g/cm³, about 0.968 g/cm³, about 0.969 g/cm³, about 0.970 g/cm³, about 0.971 g/cm³, about 0.972 g/cm³, about 0.973 g/cm³, about 0.974 g/cm³, about 0.975 g/cm³, about 0.976 g/cm³, about 0.977 g/cm³, about 0.978 g/cm³, about 0.979 g/cm³, about 0.98 g/cm³, or any ranges therebetween.

In some embodiments, the resin comprises Surpass® CCs167AB, an HDPE resin available from Nova Chemicals®; Dow® DMDD 6620, a bimodal HDPE resin available from Dow Chemical; Dow® DMDD 6620 with Hyperform® HL3-4 at a concentration of from about 3 wt. % to about 4 wt. %, an additive available from Milliken & Company which contains about 4 wt. % Hyperform® HPN-20E in a low-density polyethylene (LDPE) carrier resin; Dow® DMDE 6620, a bimodal HDPE resin available from Dow Chemical, ExxonMobil™ Paxon™ AD60-007, a medium molecular weight distribution HDPE resin available from ExxonMobil™; LyondellBasell Petrothene® LM600700, a high density polyethylene available from LyondellBasell Industries; Borealis MG9641B Polyethylene, a natural high-density polyethylene with a narrow molecular weight distribution available from Borealis AG; Marlex® 9608XD Polyethylene, an HDPE resin available from Chevron Phillips Chemical Company; Marlex® K606, an HDPE resin available from Chevron Phillips Chemical Company; ExxonMobil™ HDPE HD 7925.30, a medium molecular weight HDPE homopolymer resin available from ExxonMobil™; ExxonMobil™ Paxon™ 4700, a medium molecular weight HDPE resin available from ExxonMobil™; Formolene® HB6007, a homopolymer HDPE resin available from Formosa Plastics; EL-Lene™ H6670B, a HDPE resin available from SCG Chemicals; EL-Lene™ H6007JU, a HDPE resin available from SCG Chemicals; A60-70-162, a HDPE homopolymer, available from Ineos Olefins & Polymers USA; or any combinations thereof.

In some embodiments, the resin comprises a mixture of two or more resins. The resin may comprise any mixture of any two or more resins, so long as the mixture of two or more resins is characterized by a halftime of crystallization of less than 2 minutes when measured at 124° C., and a density of at least about 0.955 g/cm³. In some embodiments, the mixture of two or more resins includes a first resin present in the mixture in an amount of from about 90 wt. % to about 98 wt. % of the mixture; and a second resin present in the mixture in an amount of from about 2 wt. % to about 10 wt. % of the mixture. In some embodiments, the mixture of two or more resins includes: a first resin present in the mixture in an amount of from about 90 wt. % to about 98 wt. % of the mixture; and a second resin present in the mixture in an amount of from about 2 wt. % to about 10 wt. % of the mixture, wherein the first resin has a melt flow index of from about 1 to about 2 and the second resin has a melt flow index of from about 0.35 to about 0.80. For example, in some embodiments, the first resin may include Surpass® CCs167AB. In some embodiments, the second resin may include ExxonMobil™ Paxon™ AD60-007, LyondellBasell Petrothene® LM600700, Marlex® K606, ExxonMobil™ Paxon™ 4700, Formolene® HB6007, EL-Lene™ H6670B, A60-70-162, or any combinations thereof.

In some embodiments, the resin further includes one or more nucleating agents present in the resin in an amount of less than about 5 wt. %, for example about 4.5 wt. %, about 4.0 wt. %, about 3.5 wt. %, about 3.0 wt. %, about 2.5 wt. %, about 2.0 wt. %, about 1.5 wt. %, about 1.0 wt. %, about 0.5 wt. %, about 0.1 wt. %, about 500 ppm, or any ranges therebetween. In some embodiments the one or more nucleating agents may include, for example, calcium carbonate, titanium dioxide, barium sulfate, silicon dioxide, expanded graphite, POSS, multiwall carbon nanotubes ("MWNT"), monomorillonite clay, vermiculite nanocomposite mineral, talc, haloysite nanotubular clay, ultra high-molecular weight PE, sisal fibers, high-modulus PE fiber, 1, 2-cyclohexanedicarboxylic acid, calcium salt:zinc stearate, anthracene, potassium hydrogen phthalate, benzoic acid type compounds, sodium benzoate type compounds, disodium biyclo[2.2.1]heptane-2,3-dicarboxylate, 1,3:2,4-bis[2.2.1]heptane-2,3-dicarboxylate, 1,3:2,4-bis(3,4-dimethylbenzyldene) sorbitol, zinc monoglycerolate, Hyperform® HPN-20E, Hyperform® HPN-68L, Millad® 3988, ADK Stabilizer NA-11, ADK Stabilizer NA-21, or any combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Example 1

Physical Characterization of HDPE Resins

Numerous HDPE resins were prepared and tested. The resins tested included: Continuum™ DMDE 6620, a bimodal HDPE resin available from Dow® Chemical; Continuum™ DMDD 6620, a bimodal HDPE resin available from Dow® Chemical; Surpass® HPS167-AB, a homopolymer HDPE resin available from NOVA Chemicals®; B5845, an HDPE resin available from Total; ExxonMobil™ HDPE HD 9830.02, an HDPE resin available from ExxonMobil™; Braskem HDPE, an HDPE resin available from Rexinex; RTP1, a compound available from RTP Corporation containing HDPE, TiO₂, and Milliken HPE-20E; and Alathon® L5840, a lightweighting HDPE resin available from LyondellBasell. These resins were tested alone, and with various additives, as shown in Table 1 below.

TABLE 1

| Resin No. | Resin | Additive |
|---|---|---|
| 1 | Dow ® DMDE 6620 | none |
| 2 | Dow ® DMDE 6620 | 4 wt. % Standridge 15 SAM 1199 nucleating agent concentrate, containing TiO₂ and Milliken HPN-20E |
| 3 | Dow ® DMDD 6620 | none |
| 4 | Dow ® DMDD 6620 | 6 wt. % RTP A nucleating agent concentrate, containing TiO₂ and Milliken HPN-20E |
| 5 | Dow ® DMDD 6620 | 6 wt. % RTP B nucleating agent concentrate, containing TiO₂ and Milliken HPN-20E |
| 6 | Dow ® DMDD 6620 | 6 wt. % RTP C nucleating agent concentrate, containing TiO₂ and Milliken HPN-20E |
| 7 | Dow ® DMDD 6620 | 6 wt. % RTP D nucleating agent concentrate, containing TiO₂ and Milliken HPN-210M |
| 8 | Dow ® DMDD 6620 | 6 wt. % RTP E nucleating agent concentrate, containing TiO₂ and Milliken HPN-210M |
| 9 | Dow ® DMDD 6620 | 6 wt. % RTP E nucleating agent concentrate, containing TiO₂, Milliken HPN-210M, and 6.3 wt. % Calcium Carbonate |
| 10 | Dow ® DMDD 6620 | 6 wt. % RTP F nucleating agent concentrate, containing TiO₂ and Milliken HPN-210M |
| 11 | Dow ® DMDD 6620 | 6 wt. % RTP G nucleating agent concentrate, containing cand Milliken HPN-210M and HPN-20E |
| 12 | Dow ® DMDD 6620 | 6 wt. % RTP H nucleating agent concentrate, containing, TiO₂ |
| 13 | Dow ® DMDD 6620 | 6 wt. % RTP I nucleating agent concentrate, |

TABLE 1-continued

| Resin No. | Resin | Additive |
|---|---|---|
| 14 | Dow ® DMDD 6620 | 6 wt. % Plastic Color Corp. PCC 134431, containing TiO₂ and Milliken HPN-20E |
| 15 | Dow ® DMDD 6620 | 6 wt. % Plastic Color Corp. PCC 134432, containing TiO₂ and Milliken HPN-210M |
| 16 | Dow ® DMDD 6620 | 6 wt. % Standridge 15 SAM 1199 nucleating agent concentrate, containing TiO₂ and Milliken HPN-20E |
| 17 | Dow ® DMDD 6620 | 6 wt. % Entec HM237B , containing nucleating agent and colorant |
| 18 | Dow ® DMDD 6620 | 2 wt. % Milliken Hyperform ® HM3-4 |
| 19 | Dow ® DMDD 6620 | 4 wt. % Milliken Hyperform ® HM3-4 |
| 20 | Dow ® DMDD 6620 | 6 wt. % Milliken Hyperform ® HM3-4 |
| 21 | Dow ® DMDD 6620 | 8 wt. % Milliken Hyperform ® HM3-4 |
| 22 | Nova Surpass ® HPS167-AB | None |
| 23 | Nova Surpass ® HPS167-AB | 6 wt. % RTP B nucleating agent concentrate, containing TiO₂ and Milliken HPN-20E |
| 24 | Nova Surpass ® HP5167-AB | 6 wt. % RTP B nucleating agent concentrate, containing TiO₂ and Milliken HPN-20E, and 6.3wt. % Calcium Carbonate |
| 25 | RTP 1 | None |
| 26 | Total B5845 | None |
| 27 | Total B5845 | 6 wt. % RTP B nucleating agent concentrate, containing TiO₂ and Milliken HPN-20E |
| 28 | ExxonMobil ™ 9830.02 | None |
| 29 | ExxonMobil ™ 9830.02 | 6 wt. % RTP B nucleating agent concentrate, containing TiO₂ and Milliken HPN-20E |
| 30 | Braskem SGF4950HS | None |
| 31 | Braskem SGF4950HS | 6 wt. % RTP B nucleating agent concentrate, containing TiO₂ and Milliken HPN-20E |
| 32 | LyondellBasell Alathon ® L5840 | None |
| 33 | LyondellBasell Alathon ® L5840 | 6 wt. % RTP B nucleating agent concentrate, containing TiO₂ and Milliken HPN-20E |

The additives tested included: a nucleating agent concentrate obtained from Standridge; several nucleating agent concentrates obtained from RTP Co.: RTP A, RTP B, RTP C, RTP D, RTP E, RTP F, RTP G, RTP H, and RTP I; calcium carbonate; and Milliken Hyperform® HM3-4.

Specifically, these resins were tested to determine their crystallinity, enthalpy of crystallization, and crystallization half time.

FIG. 1 shows the crystalline fraction measured for each resin tested. The crystalline fraction of each resin was measured using a Perkin Elmer DSC 8000. The energy required to melt the resin in first heat was measured and translated to the crystalline fraction using the standard enthalpy of fusion calculation. As can be seen from FIG. 1, the Nova Surpass® HPS167-AB resin exhibited the highest crystalline fraction of the resins tested. Without intending to be bound by any particular theory, it is believed that resins with higher levels of crystallinity exhibit better barrier properties.

Figure 2:
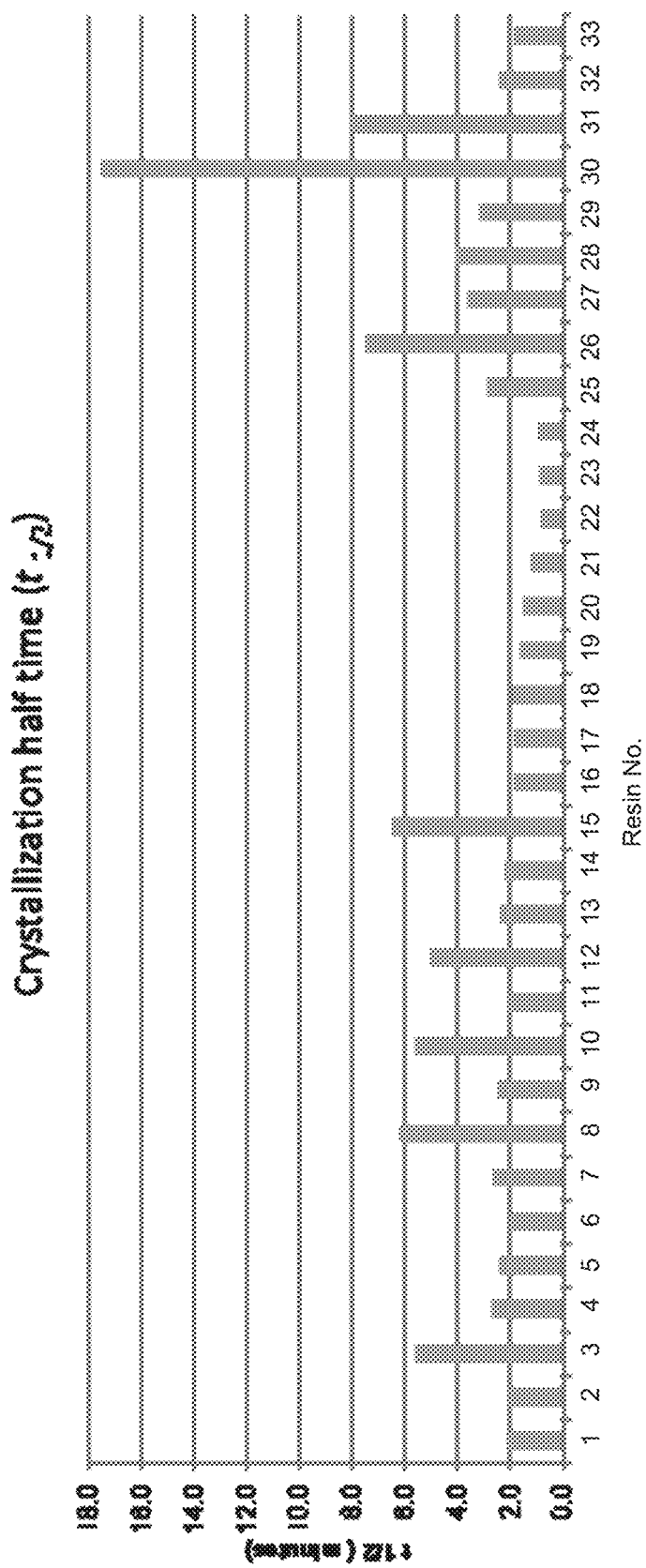
FIG. 2 is a graph illustrating the halftime of crystallization measured for various HDPE resins.

FIG. 2 shows the halftime of crystallization measured for each resin tested using a Perkin Elmer DSC 8000. First, each resin sample was heated to 160° C. at a rate of 10° C./min. and held at 160° C. for ten minutes to achieve a uniform melt. The samples were then quickly cooled at a rate of −100° C./min. to 124° C., where heat flow was measured to quantify crystallization rate. To quantify the crystallization rate, isotherms were recorded over 1200 seconds.

Other methods of determining the crystallization half time are described in the art, for example in U.S. Patent Publication No. 2010/0105839, which describes measuring the crystallization half time at 124° C. using a TA Q1000 machine. According to this protocol, the sample is heated to 160° C. at 10° C./min and held at 160° C. for 5 min, is then cooled to 124° C. at 60° C./min. and held at 124° C. for 30 min.

Without intending to be bound by any particular theory, it is believed that, particularly for compression blow formed containers, resins which have a shorter half time of crystallization result in containers having higher crystallinity and better barrier properties.

Example 2

150 cc Pharmaceutical Bottles 150 cubic centimeter (cc) pharmaceutical bottles having an average wall thickness of 0.77 mm were compression blow molded from seven different resins, as shown in Table 2 below.

TABLE 2

| Resin No. | Composition |
|---|---|
| 1 | Nova ® Surpass ® HPS167-AB |
| 2 | DMDD 6620 with 4 wt. % HL3-4A |
| 3 | DMDD 6620 with 6 wt. % HL3-4A |
| 4 | DMDE 6620 (including Hyperform ®) |
| 5 | DMDD 6620 with 6 wt. % RTP C |
| 6 | DMDD 6620 with 6 wt. % RTP B |
| 7 | MARLEX ® 5502BN |

Figure 3:
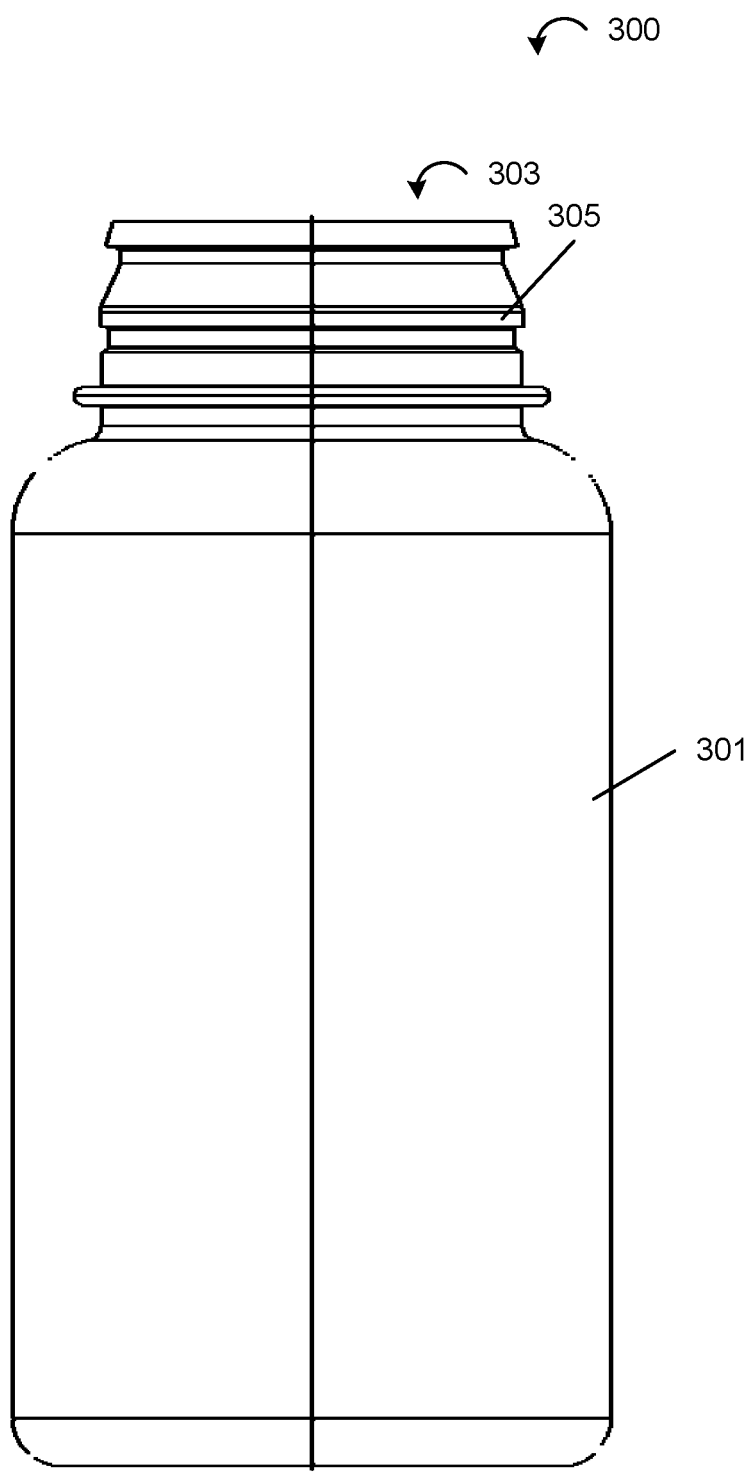
FIG. 3 is a schematic drawing of a standard 150 cc pharmaceutical bottle according to an embodiment of the present disclosure.

A schematic drawing of a 150 cc pharmaceutical bottle is shown in FIG. 3. The bottle 300 has a cylindrical sidewall 301, an opening 303, and a protrusion 305 configured to engage a removable cap with a snap interference fit.

Bottles were compression blow molded from each of these resins a model CBF20 compression blow forming machine, available from Sacmi Cooperativa Meccanici Imola Societa' Cooperativa. The resulting bottles were tested at 50° C. and at 50% relative humidity, according to USP <661> to determine their moisture vapor transmission rate (MVTR). Each of the bottles were then also tested to determine their dimension variability, shrinkage eight, ovalization, modulus, and shrinkage t-diameter using Avid Corporation's AVBIS 3000. The modulus was estimated using dynamic mechanical analyzer, DMA TA Instruments Q800. A mini sample was punched out from the side wall of each body, at the center body in the axial direction. An amplitude of 15 microns, a temperature step of 2.5° C. and a frequency of 1 Hz were used. The E' at 25° C. was recorded as the modulus. The results of each of these tests are shown in Table 3 below.

TABLE 3

| Resin No. | MVTR (mg/day) | Dimensional Variability | Shrinkage height | Ovalization | Modulus (MPa) | Shrinkage T-diameter |
|---|---|---|---|---|---|---|
| 1 | 1.2 | 0.59 | −3.05 | 0.32 | 1050 | −1.85 |
| 2 | — | 0.70 | −3.35 | 0.41 | — | −2.16 |
| 3 | 1.7 | 0.68 | −3.29 | 0.40 | 900 | −2.06 |
| 4 | 1.8 | — | −3.39 | — | 900 | −2.38 |

TABLE 3-continued

| Resin No. | MVTR (mg/day) | Dimensional Variability | Shrinkage height | Ovalization | Modulus (MPa) | Shrinkage T-diameter |
|---|---|---|---|---|---|---|
| 5 | — | 0.77 | — | 0.34 | — | — |
| 6 | 2.0 | 0.70 | −3.37 | 0.42 | 930 | −2.69 |
| 7 | 3.0 | 0.91 | — | — | 890 | — |

Example 3

60 cc Tab II Pharmaceutical Bottles 60 cubic centimeter (cc) Tab II pharmaceutical bottles having an average wall thickness of 0.70 mm were compression blow molded from five different resins. Bottles were compression blow molded from each of these resins a model CBF20 compression blow forming machine, available from Sacmi Cooperativa Meccanici Imola Societa' Cooperativa. The resulting bottles were tested at 50° C. and at 50% relative humidity, according to USP <661> to determine their moisture vapor transmission rate (MVTR), as shown in Table 4 below.

TABLE 4

| Resin No. | Composition | MVTR (mg/day) |
|---|---|---|
| 1 | MARLEX ® 5502BN | 1.61 |
| 2 | DMDD 6620 with 3 wt. % Hyperform ® HM3-4 | 0.98 |
| 3 | Nova ® Surpass ® HPS167-AB | 0.81 |
| 4 | ExxonMobil ™ Paxon ™ AD60-007 | 1.64 |
| 5 | LyondellBasell Petrothene ® LM600700 | 1.6 |

Figure 4:
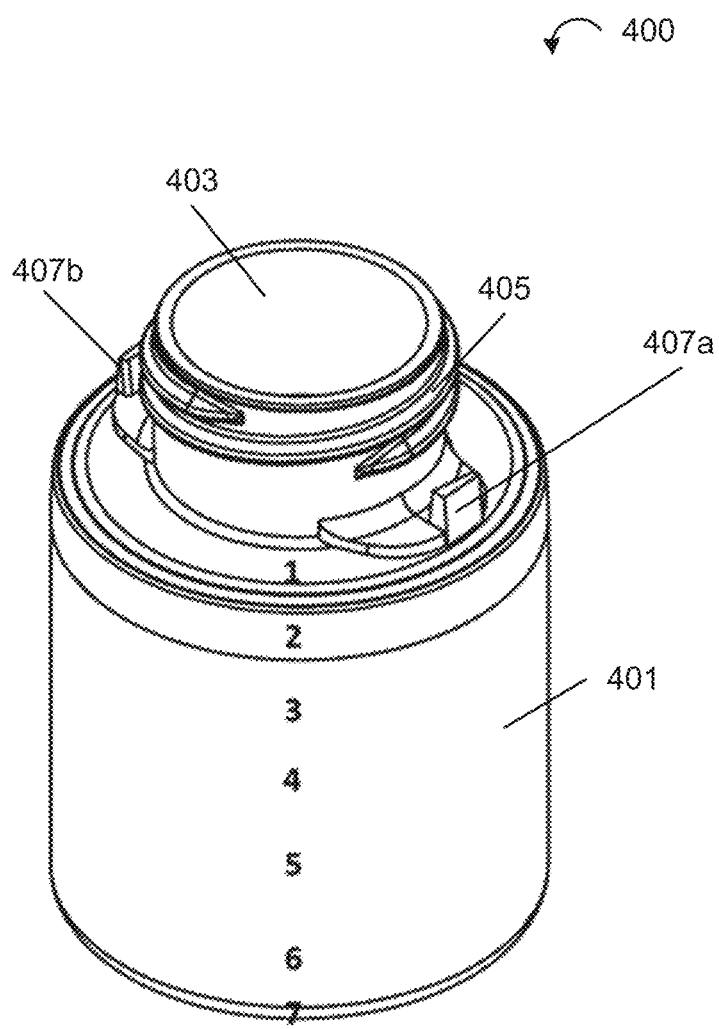
FIG. 4 is a schematic drawing of a 60 cc Tab II pharmaceutical bottle according to an embodiment of the present disclosure. While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

A schematic drawing of a 60 cc Tab II pharmaceutical bottle is shown in FIG. 4. The bottle 400 has a cylindrical sidewall 401, foil seal 403, threads 405 configured to threadingly engage a removable cap, and two tabs 407a and 407b, configured to engage one or more anti-tamper features of the removable cap.

The ExxonMobil™ Paxon™ AD60-007 resin, which exhibited a crystallization half time of 0.88 minutes, a density of 0.963 g/cm³, a MFI of 0.73, and a die swell of 1.8, did not exhibit improved MVTR compared to the MARLEX® 5502BN resin, which is a standard resin used in pharmaceutical bottles. Similarly, the LyondellBasell Petrothene® LM600700 resin, which exhibited a crystallization half time of 0.85 minutes, a density of 0.960 g/cm³, a MFI Of 0.8 and a die swell of 1.7, performed similarly to the MARLEX® 5502BN resin. While not intending to be bound by any particular theory, it is believed that the die swell of a resin may be varied somewhat independently of the crystallization half time, density, and MFI. Without intending to be bound by any particular theory, it is believed that a die swell of less than about 1.5 will also have a lower orientation of crystals within the wall section of a bottle made from these resins, resulting in a torturous path for oxygen and water molecules passing through the resin, which results in an article having better barrier properties.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of making an article, comprising:
    compression blow forming an HDPE resin characterized by:
        a halftime of crystallization of less than 2 minutes when measured at 124° C.,
        a density of at least about 0.955,
        a die swell of less than about 1.5,
    wherein the article is a pharmaceutical bottle having a higher degree of crystallinity than a pharmaceutical bottle formed from an otherwise comparable resin having a higher halftime of crystallization.

2. The method of claim 1, wherein the resin is further characterized by:
    a melt flow index of less than about 1.8 when measured according to ASTM D1238.

3. The method of claim 1, wherein the halftime of crystallization is less than 1 minute when measured at 124° C.

4. The method of claim 1, wherein the ratio of a height of the pharmaceutical bottle to a diameter of the pharmaceutical bottle is 4:1 or less.

5. The method of claim 1, wherein the article has a moisture vapor transmission rate of less than about 2 mg/day in a 150 cc bottle having an average thickness of 0.77 mm measured at 50° C. at 50% relative humidity, according to USP <661>.

6. The method of claim 1, wherein the resin comprises a mixture of two or more resins.

7. The method of claim 6, wherein the mixture of two or more resins comprises:
    a first resin present in the mixture in an amount of from about 90 wt. % to about 98 wt. % of the mixture; and
    a second resin present in the mixture in an amount of from about 2 wt. % to about 10 wt. % of the mixture,
    wherein the first resin has a melt flow index of from about 1 to about 2 and the second resin has a melt flow index of from about 0.35 to about 0.80.

8. The method of claim 1, wherein the resin comprises a nucleating agent in an amount of less than about 5 wt. %.

9. The method of claim 1, wherein the resin comprises a delustrant.

10. The method of claim 1, wherein the pharmaceutical bottle has a volume of 60 cubic centimeters or 150 cubic centimeters.

* * * * *